(12) United States Patent
Uegami et al.

(10) Patent No.: US 8,440,113 B2
(45) Date of Patent: *May 14, 2013

(54) LITHIUM MANGANATE FOR NON-AQUEOUS ELECTROLYTE SECONDARY BATTERY, PROCESS FOR PRODUCING THE SAME, AND NON-AQUEOUS ELECTROLYTE SECONDARY BATTERY

(75) Inventors: Masayuki Uegami, Yamaguchi-ken (JP); Akihisa Kajiyama, Yamaguchi-ken (JP); Kazutoshi Ishizaki, Yamaguchi-ken (JP); Hideaki Sadamura, Yamaguchi-ken (JP)

(73) Assignee: Toda Kogyo Corporation, Otake-shi, Hiroshima-ken (JP)

(*) Notice: Subject to any disclaimer, the term of this patent is extended or adjusted under 35 U.S.C. 154(b) by 492 days.

This patent is subject to a terminal disclaimer.

(21) Appl. No.: 12/594,110

(22) PCT Filed: Mar. 27, 2008

(86) PCT No.: PCT/JP2008/000763
§ 371 (c)(1),
(2), (4) Date: Apr. 19, 2010

(87) PCT Pub. No.: WO2008/126364
PCT Pub. Date: Oct. 23, 2008

(65) Prior Publication Data
US 2010/0207059 A1    Aug. 19, 2010

(30) Foreign Application Priority Data
Mar. 30, 2007   (JP) ................. 2007-092619

(51) Int. Cl.
| | | |
|---|---|---|
| H01B 1/02 | (2006.01) | |
| H01M 4/13 | (2010.01) | |
| H01M 4/50 | (2010.01) | |
| H01M 4/58 | (2010.01) | |
| C01G 51/04 | (2006.01) | |
| C01G 45/12 | (2006.01) | |
| C01D 1/02 | (2006.01) | |
| C01F 7/00 | (2006.01) | |
| C01F 11/02 | (2006.01) | |

(52) U.S. Cl.
USPC ............... 252/519.1; 252/521.2; 429/224; 429/231.1; 429/231.95; 423/594.15; 423/594.16; 423/594.5; 423/594.6; 423/599; 423/600

(58) Field of Classification Search ............ 252/500, 252/519.1, 521.2; 429/224, 231.1, 231.95; 423/594.15, 594.16, 594.5, 594.6, 599, 600
See application file for complete search history.

(56) References Cited

U.S. PATENT DOCUMENTS
2005/0265909 A1   12/2005   Kajiya et al.

FOREIGN PATENT DOCUMENTS
| EP | 1 233 001 A2 | 8/2002 |
|---|---|---|
| EP | 1 553 645 A1 | 7/2005 |
| JP | 04289662 | 10/1992 |
| JP | 2000-159522 | 6/2000 |
| JP | 2001-146425 | 5/2001 |
| JP | 2001-151511 | 6/2001 |
| JP | 2001-210324 | 8/2001 |
| JP | 2002151070 A * | 5/2002 |
| JP | 2004-339027 | 12/2004 |
| JP | 2005-347134 | 12/2005 |
| JP | 2006-252940 | 9/2006 |

OTHER PUBLICATIONS

Extended European Search Report in EP 08 72 0642 dated May 4, 2012.
International Search Report for PCT/JP2008/000763, mailed Jun. 10, 2008.
English translation of JP Office Action in JP 2007-092619 mailed Jan. 8, 2013.

* cited by examiner

Primary Examiner — Harold Pyon
Assistant Examiner — Tanisha Diggs
(74) Attorney, Agent, or Firm — Nixon & Vanderhye P.C.

(57) ABSTRACT

The present invention aims at providing lithium manganate having a high output and an excellent high-temperature stability. The above aim can be achieved by lithium manganate particles having a primary particle diameter of not less than 1 μm and an average particle diameter ($D_{50}$) of kinetic particles of not less than 1 μm and not more than 10 μm, which are substantially in the form of single crystal particles and have a composition represented by the following chemical formula: $Li_{1+x}Mn_{2-x-y}Y_yO_4$ in which Y is at least one element selected from the group consisting of Al, Mg and Co; x and y satisfy $0.03 \leq x \leq 0.15$ and $0.05 \leq y \leq 0.20$, respectively, wherein the Y element is uniformly dispersed within the respective particles, and an intensity ratio of I(400)/I(111) thereof is not less than 33% and an intensity ratio of I(440)/I(111) thereof is not less than 16%.

9 Claims, 8 Drawing Sheets

LITHIUM MANGANATE FOR NON-AQUEOUS ELECTROLYTE SECONDARY BATTERY, PROCESS FOR PRODUCING THE SAME, AND NON-AQUEOUS ELECTROLYTE SECONDARY BATTERY

This application is the U.S. national phase of International Application No. PCT/JP2008/000763, filed 27 Mar. 2008, which designated the U.S. and claims priority to Japanese Patent Application No. 2007-092619, filed 30 Mar. 2007 the entire contents of each of which are hereby incorporated by reference.

TECHNICAL FIELD

The present invention relates to lithium manganate capable of exhibiting a high output and an excellent high-temperature stability.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure and $LiMnO_2$, $LiCoO_2$, $LiCo_{1-x}Ni_xO_2$ and $LiNiO_2$ having a rock-salt type structure, or the like. Among these active substances, $LiCoO_2$ is more excellent because of high voltage and high capacity thereof, but has the problems such as a high production cost due to a less amount of cobalt raw material supplied, and a poor environmental safety upon disposal of batteries obtained therefrom. In consequence, there have now been made earnest studies on lithium manganate particles with a spinel type structure (basic composition: $LiMn_2O_2$; this is similarly applied to the subsequent descriptions) which are produced by using, as a raw material, manganese having a large supply amount, a low dost and a good environmental compatibility.

As is known in the art, the lithium manganate particles may be obtained by mixing a manganese compound and a lithium compound at a predetermined ratio and then calcining the resulting mixture at a temperature of 700 to 800° C.

When using the lithium manganate particles as a positive electrode active substance for lithium ion secondary batteries, the resulting battery has a high voltage and a high energy density, but tends to be deteriorated in charge/discharge cycle characteristics. The reason therefor is considered to be that when charge/discharge cycles are repeated, the crystal lattice is expanded and contracted owing to desorption and insertion behavior of lithium ions in the crystal structure to cause change in volume of the crystal, resulting in occurrence of breakage of the crystal lattice or dissolution of Mn in an electrolyte solution.

At present, in the lithium ion secondary batteries using lithium manganate particles, it has been strongly required to suppress deterioration in charge/discharge capacity due to repeated charge/discharge cycles, and improve the charge/discharge cycle characteristics.

In order to improve the charge/discharge cycle characteristics of the batteries, the positive electrode active substance used therein which comprise the lithium manganate particles is required to have an excellent packing property and an appropriate size. To meet the requirements, there have been proposed the method of suitably controlling a particle size and a particle size distribution of the lithium manganate particles; the method of obtaining the lithium manganate particles having a high crystallinity by controlling a calcining temperature thereof; the method of adding different kinds of elements to the lithium manganate particles to strengthen a bonding force of the crystals; the method of subjecting the lithium manganate particles to surface treatment to suppress elution of Mn therefrom; or the like.

Conventionally, it is known that aluminum as one of the different kinds of elements is incorporated in the lithium manganate particles (for example, refer to Patent Documents 1 to 6).

More specifically, there are respectively described the method of incorporating a Ca compound and/or a Ni compound as well as an Al compound in the lithium manganate particles (for example, refer to Patent Document 1); the method of incorporating Al in the lithium manganate particles in which positions of peaks of respective diffraction planes as observed in X-ray diffraction thereof are defined (for example, refer to Patent Document 2); the method of incorporating a different kind of element such as Al in the lithium manganate particles and conducting the calcination of the lithium manganate particles at multiple separate stages (for example, refer to Patent Document 3); lithium manganate particles incorporated with a different kind of element such as Al which have a specific surface area of 0.5 to 0.8 $m^2/g$ and a sodium content of not more than 1000 ppm (for example, refer to Patent Document 4); lithium manganate particles incorporated with a different kind of element such as Al which have a half value width of (400) plane of not more than 0.22° and an average particle diameter of crystal particles of not more than 2 μm (for example, refer to Patent Document 5); and lithium manganate particles incorporated with a different kind of element such as Al which have a crystallite size of not less than 600 Å and a lattice distortion of crystal particles of not more than 0.1% (for example, refer to Patent Document 6).

Patent Document 1: Japanese Patent Application Laid-Open (KOAKI) No. 2000-294237
Patent Document 2: Japanese Patent Application Laid-Open (KOAKI) No. 2001-146425
Patent Document 3: Japanese Patent Application Laid-Open (KOAKI) No. 2001-328814
Patent Document 4: Japanese Patent Application Laid-Open (KOAKI) No. 2002-33099
Patent Document 5: Japanese Patent Application Laid-Open (KOAKI) No. 2002-316823
Patent Document 6: Japanese Patent Application Laid-Open (KOAKI) No. 2006-252940

DISCLOSURE OF THE INVENTION

Problem to be Solved by the Invention

At present, it has been strongly required to provide lithium manganate as a positive electrode active substance for a non-aqueous electrolyte secondary battery which is improved in output characteristics and high-temperature characteristics. However, the lithium manganate capable of fully satisfying these requirements has not been obtained until now.

That is, in Patent Documents 1 to 6, there are respectively described lithium manganates in which a part of manganese is substituted with a metal element or a different kind of element such as boron. However, these lithium manganates have failed to provide batteries capable of exhibiting satisfactory high-temperature storage characteristics and, therefore, tend to be insufficient for practical use.

In addition, these conventional materials have also failed to exhibit a level enough to satisfy the high-temperature storage characteristics only by the improvement in crystallinity thereof and, therefore, tend to be insufficient for practical use.

Further, even though the XRD half-width of these conventional materials lies within a specific suitable range, since the measurement accuracy for such crystals having a size of several microns (μm) is very low in the principle of measurement, they have still often failed to exhibit satisfactory high-temperature storage characteristics or output characteristics.

Means for Solving the Problem

Under these circumstances, the present inventors have noticed an intensity ratio of diffracted rays in (111), (400) and (440) planes as basic planes of a cubic system spinel crystal. As a result, it has been found that when the intensity ratio is out of an X-ray diffraction peak intensity ratio of lithium manganate as indicated by JCPDS35-0782, the resulting material can be improved in high-temperature storage characteristics.

In addition, as to uniformity of the lithium manganate, only when the positions of presence of Mn and Y (such as Al, Co and Mg) are examined from an outside of the particles, it is not possible to surely determine a uniformity of Y within the particles, so that the mixed condition of Y—Mn as well as calcining conditions thereof can be optimized only to an insufficient extent. Therefore, it has been found that the resulting material is considerably deteriorated in output characteristics despite of a uniform appearance of the particles. As a result, it has been found that when evaluated by EPMA or EDX mapping of a section of the respective particles, the uniformity of distribution of Al within the particles can be enhanced, so that the resulting battery can be improved in both of output characteristics and high-temperature storage characteristics at the same time.

That is, the above-mentioned technical subject or object can be achieved by the following aspects of the present invention.

That is, in accordance with the present invention, there are provided lithium manganate particles having a primary particle diameter of not less than 1 μm and an average particle diameter ($D_{50}$) of secondary particles of 1 to 10 μm, which have a composition represented by the following chemical formula:

$$Li_{1+x}Mn_{2-x-y}Y_yO_4$$

in which Y is at least one element selected from the group consisting of Al, Mg and Co; x and y satisfy $0.03 \leq x \leq 0.15$ and $0.05 \leq y \leq 0.20$, respectively, the Y element being uniformly dispersed within the respective particles, an intensity ratio of I(400)/I(111) thereof being not less than 33% and an intensity ratio of I(440)/I(111) thereof being not less than 16% (Invention 1).

Also, according to the present invention, there are provided the above lithium manganate particles having a lattice constant of 0.818 to 0.821 nm (Invention 2).

Also, according to the present invention, there are provided the above lithium manganate particles wherein a rate of change in BET specific surface area of the lithium manganate particles when applying a pressure of 1 ton/cm² thereto is 0 to 10% based on a BET specific surface area of the particles before applying the pressure thereto (Invention 3).

Also, according to the present invention, there are provided the lithium manganate particles as described in any one of the above Inventions, wherein upon measurement of charge/discharge capacities of a battery obtained using the lithium manganate particles, an initial discharge capacity thereof is not less than 80 mAh/g and not more than 110 mAh/g (Invention 4).

In addition, according to the present invention, there is provided a process for producing the lithium manganate particles as described in any one of the above Inventions, comprising the steps of mixing manganese oxide particles whose surface is coated with a compound of at least one element selected from the group consisting of Al, Co and Mg, with lithium carbonate; and calcining the resulting mixture at a temperature of not lower than 900° C. (Invention 5).

Also, according to the present invention, there is provided the above process for producing the lithium manganate particles, further comprising the step of adding an Al-containing aqueous solution to a water suspension comprising the manganese oxide particles to suitably adjust a pH value of the resulting mixture, wherein an Al compound formed on the surface of the respective manganese oxide particles is non-crystalline as analyzed by an X-ray diffraction method (Invention 6).

Also, according to the present invention, there is provided the above process as described in any one of the above Inventions, wherein the manganese oxide particles have an average particle diameter of not less than 1 μm (Invention 7).

Further, according to the present invention, there is provided a non-aqueous electrolyte secondary battery comprising a positive electrode active substance a part or whole of which is formed from the above lithium manganese particles (Invention 8).

EFFECT OF THE INVENTION

The lithium manganate particles according to the present invention exhibit a high output and an excellent high-temperature stability and, therefore, are suitably used as a positive electrode substance for a non-aqueous electrolyte secondary battery.

PREFERRED EMBODIMENT FOR CARRYING OUT THE INVENTION

Figure 1:
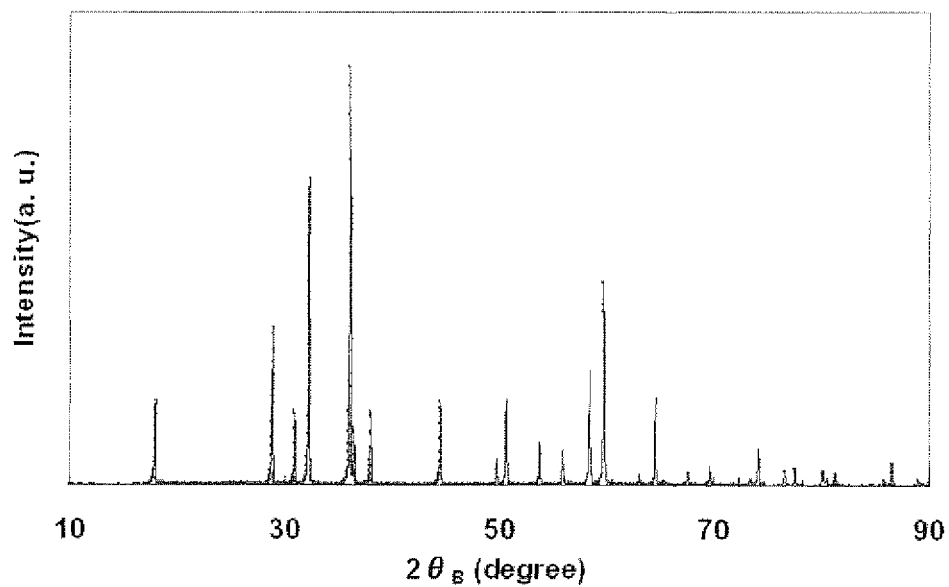
FIG. 1 is an X-ray diffraction pattern of manganese oxide particles obtained in Example 2 before being treated with Al.

The present invention is described in detail below.

First, the lithium manganate particles for a non-aqueous electrolyte secondary battery according to the present invention are described.

The lithium manganate particles according to the present invention comprise at least one metal element of Al, Mg and Co which is uniformly dispersed within the particles without being localized on the surface of the respective particles. In addition, in the crystal structure of the lithium manganate particles, the (400) and (440) planes are grown relative to the (111) plane.

The lithium manganate particles according to the present invention have a composition represented by the following chemical formula:

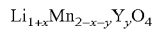

$$Li_{1+x}Mn_{2-x-y}Y_yO_4$$

in which Y is at least one element selected from the group consisting of Al, Mg and Co; x is 0.03 to 0.15; and y is 0.05 to 0.20.

When x is less than 0.03, the resulting particles have a high capacity, but tend to be considerably deteriorated in high-temperature characteristics. When x is more than 0.15, the resulting particles exhibit improved high-temperature characteristics, but tend to be considerably deteriorated in capacity or tend to cause increase in resistance owing to formation of Li-rich phase therein. The value of x is preferably 0.05 to 0.15.

When y is less than 0.05, it may be difficult to attain a sufficient effect of addition of the Y element. When y is more than 0.20, the resulting particles tend to suffer from large decrease in capacity and, therefore, tend to be unpractical. The value of y is preferably 0.05 to 0.15.

In the lithium manganate particles according to the present invention, the Y element is uniformly dispersed within the particles. When the Y element is localized in the particles, the resulting particles tend to be deteriorated in stability. Meanwhile, the "uniform dispersion of the Y element within lithium manganate particles" as used herein means that the Y element is present over a whole portion extending from the surface to the central portion of the respective particles without being localized at specific portions thereof. More specifically, as evaluated in the below-mentioned Examples, when the section of the respective particles is subjected to EDX plane analysis by observing the particles using a scanning electron microscope equipped with an energy disperse type X-ray analyzer, the "uniform dispersion" means that the area of a white portion appearing on its micrograph which indicates the presence of the Y element is not less than 98% and preferably 100% of a cross-sectional area of the respective particles.

In the lithium manganate particles according to the present invention, an intensity ratio of I(400)/I(111) thereof is not less than 33%, and an intensity ratio of I(440)/I(111) thereof is not less than 16%. When the I(400) and I(440) are out of the above-specified ranges, the obtained particles tend to cause deterioration in stability and output of the resulting battery. The intensity ratio of I(400)/I(111) is preferably 35 to 70%, and the intensity ratio of I(440)/I(111) is preferably 20 to 50%.

The lithium manganate particles according to the present invention preferably have a lattice constant of 0.818 to 0.821 nm. When the lattice constant is less than 0.818 nm, the obtained particles tend to cause deterioration in capacity of the resulting battery. When the lattice constant is more than 0.821 nm, the obtained particles tend to cause deterioration in stability of the resulting battery. The lattice constant of the lithium manganate particles is more preferably 0.819 to 0.821 nm.

The lithium manganate particles according to the present invention preferably have a primary particle diameter of 1.0 to 10 μm. When the primary particle diameter is less than 1 μm, the obtained particles tend to cause deterioration in stability of the resulting battery. When the primary particle diameter is more than 10 μm, the obtained particles tend to cause deterioration in output of the resulting battery. The primary particle diameter of the lithium manganate particles is more preferably 1.0 to 8.0 μm.

The lithium manganate particles according to the present invention preferably have an average particle diameter ($D_{50}$) of secondary particles of not less than 1.0 and not more than 10 μm. When the average particle diameter ($D_{50}$) is less than 1 μm, the obtained particles tend to cause deterioration in stability of the resulting battery. When the average particle diameter ($D_{50}$) is more than 10 μm, the obtained particles tend to cause deterioration in output of the resulting battery. The average particle diameter ($D_{50}$) of secondary particles of the lithium manganate particles is more preferably 2.0 to 8.0 μm.

The lithium manganate particles according to the present invention are preferably constituted substantially from single crystal particles. When the lithium manganate particles are constituted from polycrystals, a large number of lattice-unconformity planes acting as a resistance component upon extraction and insertion of lithium tend to be present in the crystals, so that it may be sometimes difficult to allow the resulting battery to generate a sufficient output.

When applying a pressure of 1 ton/cm$^2$ to the lithium manganate particles according to the present invention, the rate of change in BET specific surface area thereof is preferably 0 to 10% based on a BET specific surface area of the particles before being compressing. When the rate of change in BET specific surface area is more than 10%, highly active interfaces tend to be newly formed upon production of the electrode, so that the reaction of the electrode with an electrolyte solution tends to be promoted, resulting in deteriorated output and stability of the resulting battery. The rate of change in BET specific surface area of the lithium manganate particles is more preferably 1 to 10%.

Meanwhile, the BET specific surface area of the lithium manganate particles according to the present invention before applying the pressure thereto is preferably not more than 1 m$^2$/g.

Next, the process for producing the lithium manganate particles according to the present invention is described.

The lithium manganate particles according to the present invention can be obtained by using trimanganese tetraoxide ($Mn_3O_4$) constituted substantially from single crystals as a manganese precursor, and conducting the steps of treating the manganese precursor with a compound in the form of very fine particles having a low crystallinity (it means such a condition that the addition of even 10 mol % of the compound is not detectable by X-ray diffraction) in an aqueous solution thereof, and calcining a mixture of the thus treated material and Li at a temperature of not lower than 900° C. and preferably 950 to 1050° C. upon the calcination reaction therebetween.

The trimanganese tetraoxide ($Mn_3O_4$) used in the present invention preferably has an average particle diameter of 1.0 to 8 μm, a primary particle diameter of 1 to 8 μm and a BET specific surface area of 0.5 to 15 $m^2/g$.

When using the manganese precursor having a good crystallinity, the reactivity of the manganese precursor with an Al compound tends to be lowered. As a result, even when using the Al compound having a submicron size, it may be difficult to obtain a uniform solid solution condition. Therefore, it is necessary to conduct the reaction under such a condition that the aluminum compound that is very fine and low-crystallinity to such an extent as to be undetectable by X-ray diffraction, is uniformly mixed in the manganese precursor.

In order to provide the aluminum compound as a surface-coating material which has the above condition, a suspension of the manganese precursor may be mixed with an ionic aqueous solution of aluminum to form a uniformly mixed condition of the manganese precursor and aluminum ions, and then a pH value of the resulting mixture may be suitably adjusted, thereby producing the condition in which the very fine and low-crystallinity hydroxide is uniformly mixed in the manganese precursor.

As to the reaction conditions, when being coated with the aluminum compound, the pH value of the reaction solution is controlled to 6 to 10, and the reaction temperature is controlled to 10 to 90° C.

Also, when being coated with Mg, the pH value of the reaction solution is controlled to 9 to 11, and the reaction temperature is controlled to 10 to 90° C. When being coated with Co, the pH value of the reaction solution is preferably controlled to 7 to 10, and the reaction temperature is preferably controlled to 10 to 90° C.

After mixing the thus obtained Al-containing manganese oxide with the lithium compound, the resulting mixture is subjected to calcination reaction to obtain lithium manganate. It is required that the calcining temperature is not lower than 900° C. When the calcining temperature is lower than 900° C., it is not possible to obtain the condition in which aluminum is uniformly distributed within the particles.

In the above-mentioned Patent Document 2 (Japanese Patent Application Laid-Open (KOKAI) No. 2001-146425), it is described that the uniformly mixed condition of Al has been confirmed by EPMA analysis of an appearance of the respective particles. Such a result will be attained even when Al is localized only on the surface of the particles. However, when actually measuring an output of a battery obtained using the particles in which Al was localized, such a battery exhibited a large resistance, and it was difficult to generate a suitable current from the battery. The calcining temperature is preferably 950 to 1050° C.

Next, the positive electrode using the positive electrode active substance comprising the lithium manganate particles for a non-aqueous electrolyte secondary battery according to the present invention is described.

When producing the positive electrode using the positive electrode active substance according to the present invention, a conducting agent and a binder are added to and mixed in the positive electrode active substance by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance according to the present invention comprises the above positive electrode, a negative electrode and an electrolyte.

Examples of a negative electrode active substance which may be used in the negative electrode include metallic lithium, lithium/aluminum alloy, lithium/tin alloy and graphite.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride in the above solvent.

The secondary battery produced by using the positive electrode active substance according to the present invention has an initial discharge capacity of not less than 80 mAh/g, and exhibits a high-load capacity retention rate of not less than 80%, a post-storage capacity retention rate of not less than 60%, a capacity recovery rate of not less than of 90% and a high-temperature cycle capacity retention rate of not less than 90%.

In the positive electrode using the lithium manganate particles according to the present invention, when the discharge capacity thereof is less than 80 mAh/g, the resulting battery tends to exhibit a low output and, therefore, tends to be unpractical. The discharge capacity of the positive electrode is preferably 90 to 110 mAh/g. When the discharge capacity is more than 110 mAh/g, it may be difficult to ensure a sufficient stability of the resulting battery.

<Function>

The important point of the present invention resides in that the lithium manganate particles have a high crystallinity, in particular, a high intensity ratio of each of $I(440)/I(111)$ and $I(400)/I(111)$, and in that Al, Mg or Co as a substituting element is uniformly dispersed in the particles.

In the present invention, by attaining the condition in which the manganese oxide and the fine and low-crystalline aluminum compound are homogeneously mixed with each other, and calcining the resulting mixture at a temperature as high as not lower than 900° C., it is possible to obtain the lithium manganate having the above characteristics.

As a result, the secondary battery using the lithium manganate particles according to the present invention can be improved in both output characteristics and high-temperature storage characteristics at the same time.

EXAMPLES

Typical embodiments of the present invention are described in more detail below.

The average particle diameter ($D_{50}$) of secondary particles is a volume-based average particle diameter as measured by a wet laser method using a laser type particle size distribution measuring apparatus "MICROTRACK HRA" manufactured by Nikkiso Co., Ltd.

The primary particle diameter is expressed by an average value of diameters read out from a SEM image.

The condition of presence of the particles which are allowed to be coated or present on particles was observed and determined using a scanning electron microscope "SEM-EDX" equipped with an energy disperse type X-ray analyzer (manufactured by Hitachi High-Technologies Corp.).

The average primary particle diameter of the particles which are allowed to be coated or present on particles was observed and determined using a scanning electron microscope "SEM-EDX" equipped with an energy disperse type X-ray analyzer (manufactured by Hitachi High-Technologies Corp.).

The X-ray diffraction of the sample was measured using "RAD-IIA" manufactured by Rigaku Co., Ltd.

The lattice constant was calculated from the results of the above powder X-ray diffraction by a Rietveld method.

Whether the crystal structure is a single crystal or not was confirmed by observing an oriented plane of section of the particles by EBSD.

The coin cell (coin-type battery) produced by the following method using the lithium manganate particles was evaluated for initial charge/discharge characteristics and high-temperature storage characteristics.

First, 93% by weight of the Li—Mn composite oxide as a positive electrode active substance, 2% by weight of acetylene black and 2% by weight of a graphite "KS-16" both serving as a conducting material, and 3% by weight of polyvinylidene fluoride dissolved in N-methyl pyrrolidone as a binder, were mixed with each other, and the resulting mixture was applied onto an Al metal foil and then dried at 150° C. The thus obtained sheets were each blanked into 16 mmϕ and then pressed together under a pressure of 1 t/cm$^2$, thereby producing an electrode having a thickness of 50 µm and using the thus produced electrode as a positive electrode. A metallic lithium blanked into 16 mmϕ was used as a negative electrode. An electrolyte solution was 1 mol/L of $LiPF_6$ in a 3:7 volume ratio of EC and DEC, thereby producing a coin cell of a CR2032 type.

The initial charge/discharge characteristics of the cell were determined as follows. That is, under a room temperature condition, the cell was charged at a current density of 0.1 C until reaching 4.3 V, and then was subjected to constant-voltage charging for 90 min and discharged at a current density of 0.1 C until reaching 3.0 V to measure an initial charge capacity, an initial discharge capacity and an initial efficiency of the cell.

The high-load characteristics of the lithium manganate particles were determined as follow. That is, the cell was subjected to measurement of a discharge capacity (a) at a current density of 0.1 C, and charged again at a current density of 0.1 C and then subjected to measurement of a discharge capacity (b) at a current density of 10 C to calculate a percentage (%) of "b/a×100".

Also, the capacity retention rate and capacity recovery rate as high-temperature storage characteristics were determined as follows. That is, the cell was charged at a current density of 0.1 C until reaching 4.3 V and then discharged until reaching a discharge depth of 70%. Thereafter, the cell was allowed to stand at 60° C. for one week to measure a residual discharge capacity (c) and calculate a capacity retention rate (=100×c/(0.3×a)). Further, the cell was subjected again to charge/discharge cycle at a current density of 0.1 C to measure a discharge capacity (d) and calculate a capacity recovery rate (=100×d/a).

The high-temperature cycle capacity retention rate was determined as follows. That is, the cell was subjected to repeated charge/discharge cycles at a rate of 0.3 C at 60° C., and the ratio of 30th cycle discharge capacity to the initial discharge capacity thereof was measured and determined as the high-temperature cycle capacity retention rate.

Example 1

Production of Lithium Manganate Particles

Under a nitrogen gas flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., washed with water and then dried, thereby obtaining manganese oxide particles.

The thus obtained manganese oxide particles was $Mn_3O_4$ and had a granular shape, an average particle diameter of 4.8 µm and a BET specific surface area of 0.6 m$^2$/g.

The resulting water suspension comprising the manganese oxide particles was washed with water in an amount of 5 times the amount of the suspension using a filter press, and further subjected to re-pulp to adjust a concentration of the manganese oxide particles in the suspension to 10% by weight. A 0.2 mol/L sodium aluminate aqueous solution was continuously fed to the suspension in a reaction vessel such that a molar ratio of Mn:Al in the resulting mixture was 95:5. The contents of the reaction vessel were always kept stirred by a stirrer and, at the same time, a 0.2 mol/L sulfuric acid aqueous solution was automatically supplied thereto so as to control the pH of the reaction solution in the reaction vessel to 8±0.5, thereby obtaining a suspension comprising the manganese oxide particles whose surface was coated with aluminum hydroxide.

The resulting suspension was washed with water in an amount of 10 times the weight of the manganese oxide particles in the suspension using a filter press, and then dried, thereby obtaining the manganese oxide particles whose surface was coated with aluminum hydroxide and which had a molar ratio of Mn:Al of 95:5 and an average secondary particle diameter of 4.8 µm.

The resulting aluminum hydroxide-coated manganese oxide was subjected to X-ray diffraction measurement. As a result, it was confirmed that no peak attributed to the Al compound was detected.

The above $Mn_3O_4$ particles and lithium carbonate were mixed with each other for 1 hr at a proportion of Li:Mn:Al=1.065:1.835:0.10, thereby obtaining a uniform mixture. Fifty grams of the thus obtained mixture was placed in an aluminum crucible, and held therein in atmospheric air at 960° C. for 4 hr, thereby obtaining lithium manganate particles.

The thus obtained lithium manganate particles had a composition: $Li_{1+x}Mn_{2-x-y}Y_yO_4$ in which x is 0.065 and y is 0.10; an average primary particle diameter of 1.0 µm; an average particle diameter ($D_{50}$) of secondary particles of 4.0 µm; a BET specific surface area value of 0.94 m$^2$/g; a BET specific surface area value after compressed of 0.96 m$^2$/g; a rate of change in BET of 2%; an intensity ratio of I(400)/I(111) of 38%; an intensity ratio of I(440)/I(111) of 20%; and a lattice constant of 0.8203 nm.

The coin cell produced by using a positive electrode active substance comprising the thus obtained lithium manganate particles had an initial discharge capacity of 108 mAh/g, a discharge capacity of 100 mAh/g as measured at a current density of 10 C, and a rate efficiency of 93%. After the cell was preserved at 60° C. for one week, it was confirmed that the capacity retention rate (RTN) and capacity recovery rate (RCV) of the cell were 65% and 90%, respectively. In addition, after the cell was subjected to 30 charge/discharge cycles at 60° C., it was confirmed that the capacity retention rate (RTN) of the cell was 95%.

Examples 2 to 10

The same procedure as defined in Example 1 was conducted except that kind of manganese oxide used, kind of Y (Al, Co, Mg), coating amount of aluminum, and calcining conditions, were changed variously, thereby obtaining lithium manganate particles.

The production conditions used above are shown in Table 1, and various properties of the thus obtained lithium manganate particles are shown in Table 2.

Figure 2:
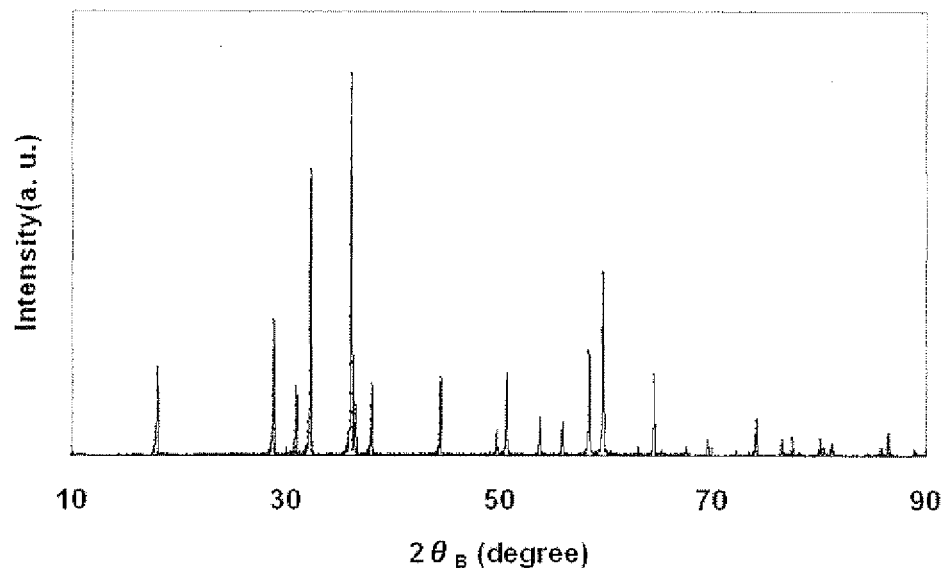
FIG. 2 is an X-ray diffraction pattern of manganese oxide particles obtained in Example 2 after being treated with Al.
Figure 3:
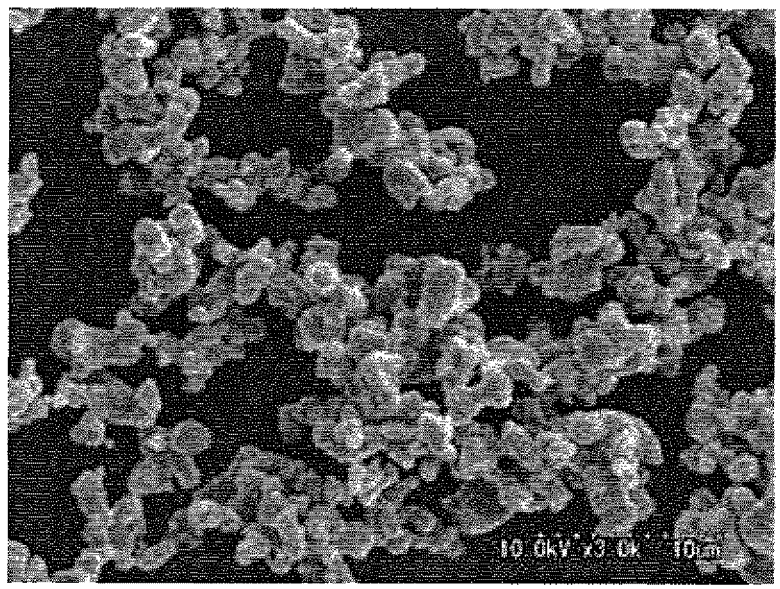
FIG. 3 is a SEM image of lithium manganate obtained in Example 1.
Figure 4:
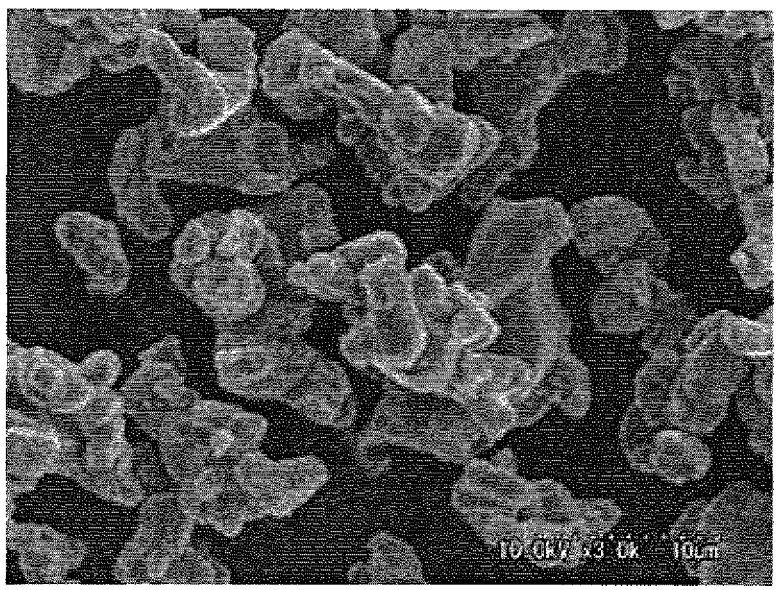
FIG. 4 is a SEM image of lithium manganate obtained in Example 2.
Figure 5:
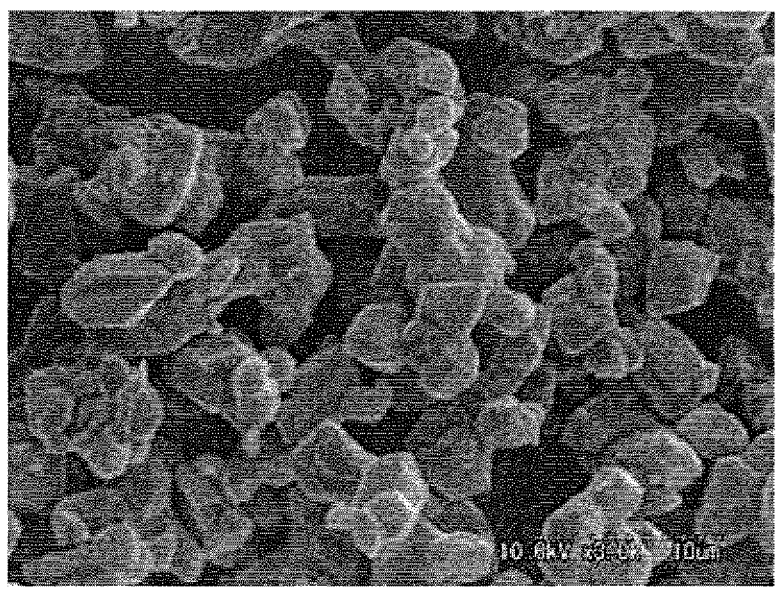
FIG. 5 is a SEM image of lithium manganate obtained in Example 3.

The X-ray diffraction pattern of the manganese oxide before being treated with Al which was obtained in Example 2 is shown in FIG. 1, and the X-ray diffraction pattern of the manganese oxide after being treated with Al which was obtained in Example 2 is shown in FIG. 2. In FIG. 2, no peak attributed to the Al compound was observed. As a result, it was confirmed that the Al compound was present in the form of very fine low-crystalline particles.

Figure 6:
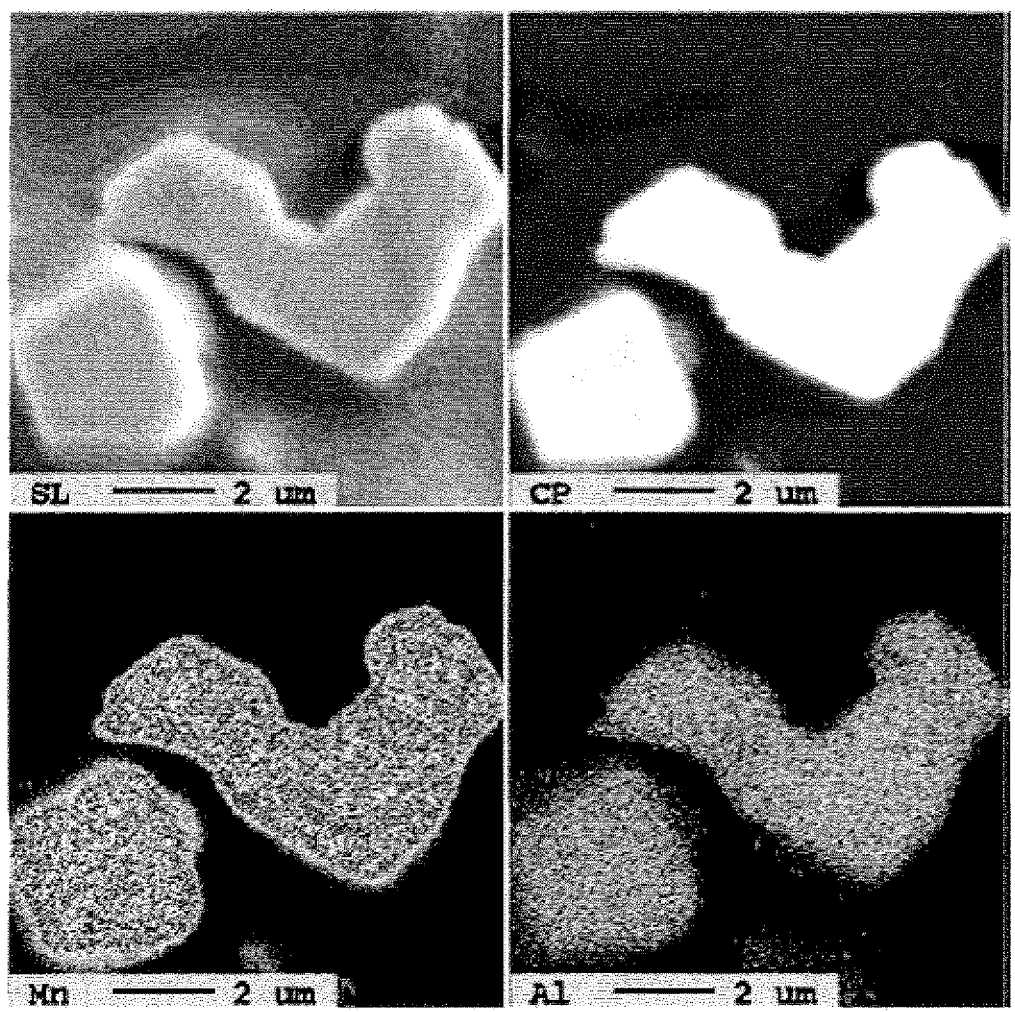
FIG. 6 shows a SEM image and a reflection image of section of lithium manganate particles obtained in Example 2 as well as EPMA mapping of Mn and Al therein.

The lithium manganate particles obtained in Example 2 were kneaded with a resin, and the resulting kneaded material was cut using a cross-section polisher. The results of EPMA mapping of Mn and Al on a section of each of the thus cut particles are shown in FIG. 6. In FIG. 6, the condition of presence of Mn element is indicated in a left lower side portion thereof, whereas the condition of presence of Al element is indicated in a right lower side portion thereof. The white portion indicating the presence of Al element occupied substantially 100% of the section of the respective particles. Therefore, there existed no portion where any Al element was not present. In addition, the condition of gradation of the white portion indicating the presence of Al element was substantially consistent with the condition of gradation indicating the presence of Mn element. As a result, it was confirmed that Al was also uniformly distributed over the section of each particle similarly to Mn.

Comparative Example 1

Manganese oxide ($MnO_2$; average particle diameter: 15 μm), aluminum hydroxide ($Al(OH)_3$) and lithium carbonate were mixed with each other, and then calcined at 960° C., thereby obtaining lithium manganate particles.

Comparative Examples 2 to 5, 8 and 9

The same procedure as defined in Example 1 was conducted except that kind of manganese oxide used, coating amount of aluminum, and calcining conditions, were changed variously, thereby obtaining lithium manganate particles.

The production conditions used above are shown in Table 1, and various properties of the thus obtained lithium manganate particles are shown in Table 2.

Comparative Example 7

Manganese oxide ($MnO_2$; average particle diameter: 15 μm), aluminum hydroxide ($Al(OH)_3$) and lithium carbonate were mixed with each other, and then calcined at 960° C., thereby obtaining lithium manganate particles.

The production conditions used above are shown in Table 1, and various properties of the thus obtained lithium manganate particles are shown in Table 2. The lithium manganate particles obtained in Examples 1 and 3 to 10 were measured in the same manner as in Example 2 to determine a composition of section of the respective particles. As a result, in any of these Examples, it was confirmed that Al was uniformly present over the section of the respective particles.

Figure 7:
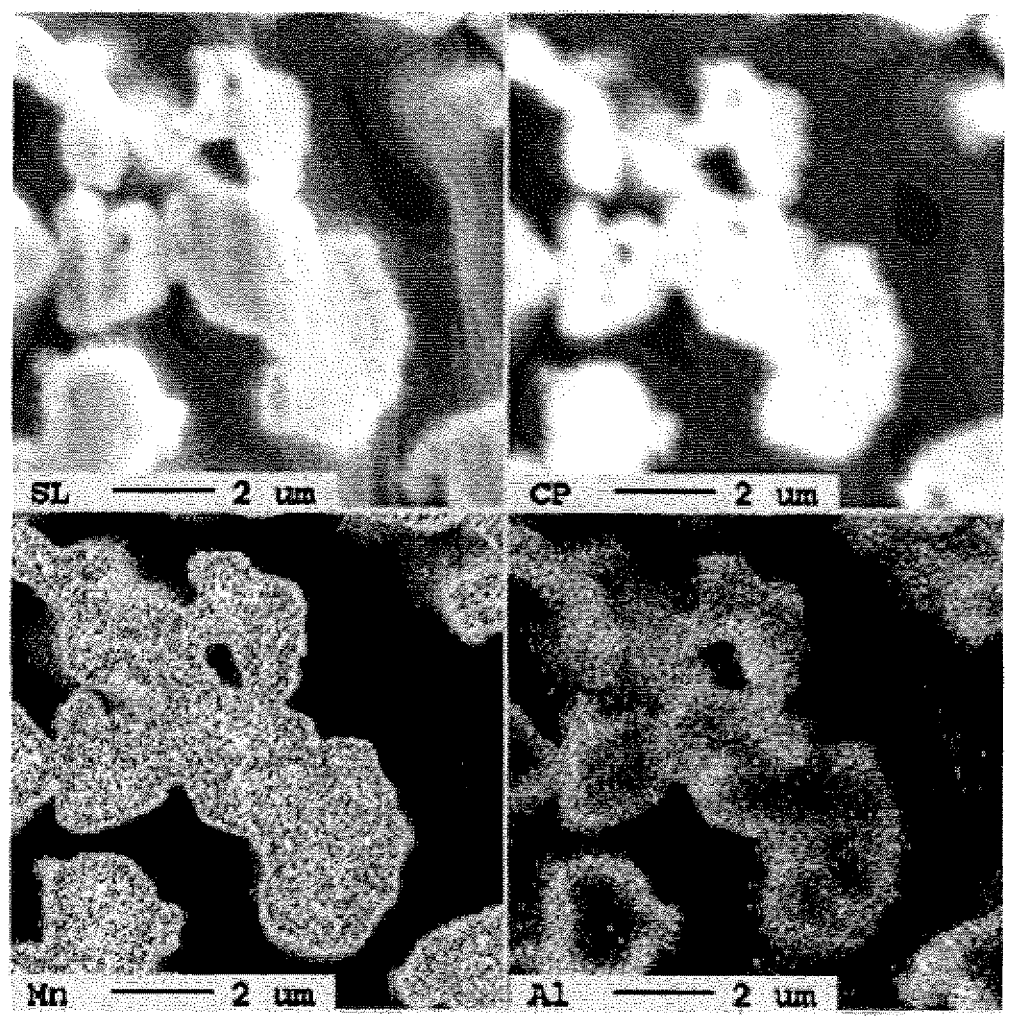
FIG. 7 shows a SEM image and a reflection image of section of lithium manganate particles obtained in Comparative Example 6 as well as EPMA mapping of Mn and Al therein.
Figure 8:
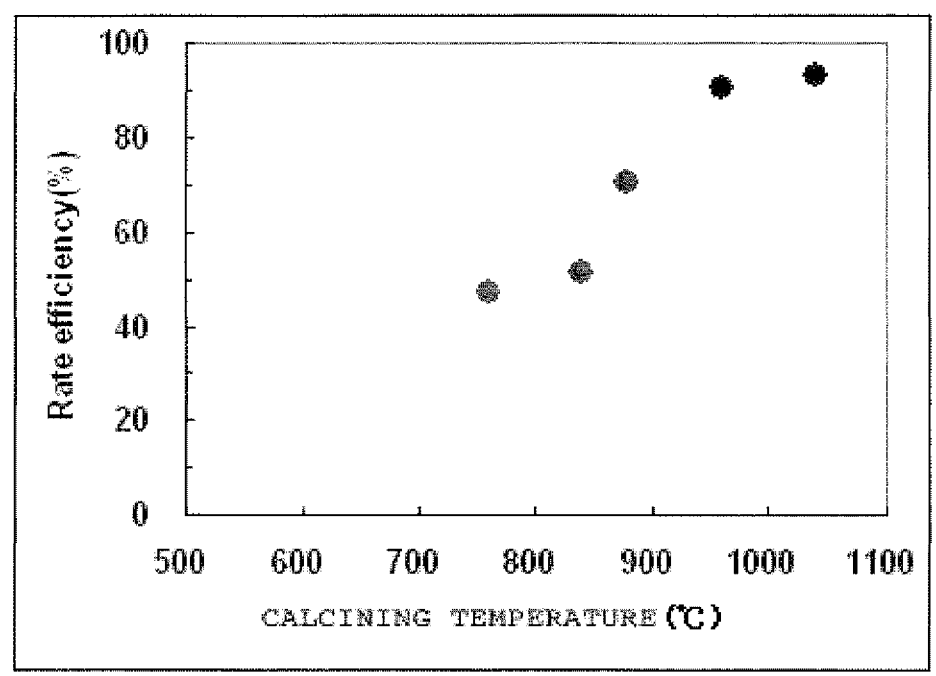
FIG. 8 is a view showing a relationship between calcining temperature and rate efficiency.
Figure 9:
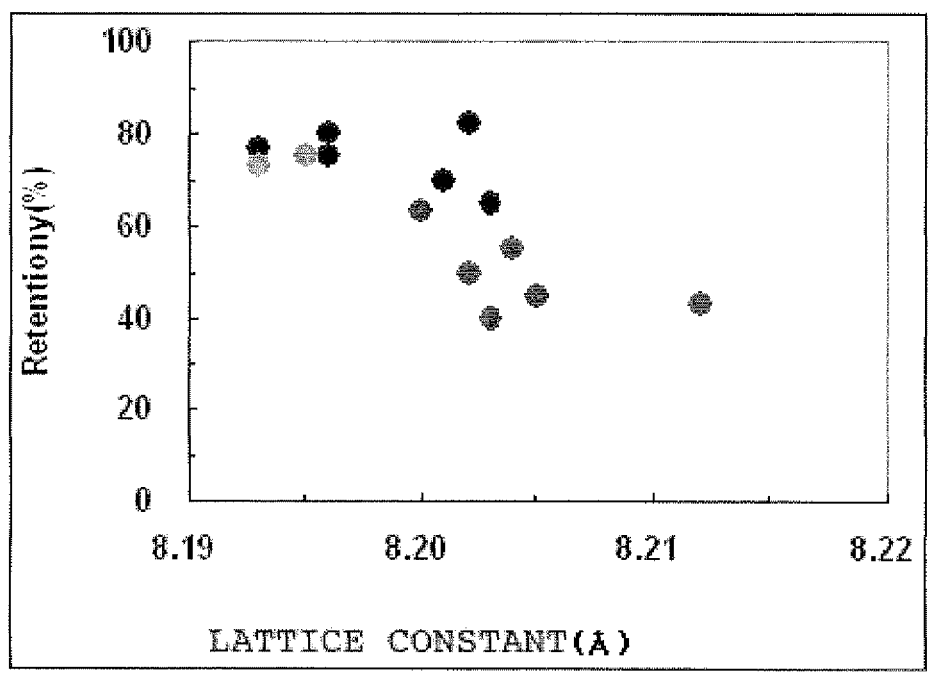
FIG. 9 is a view showing a relationship between lattice constant and capacity retention rate.
Figure 10:
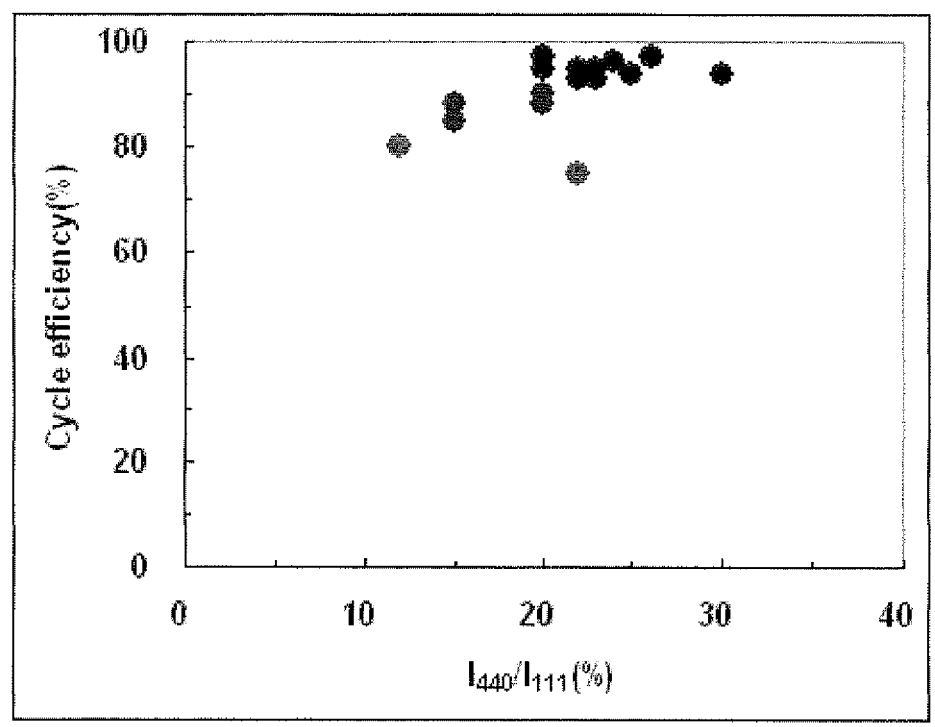
FIG. 10 is a view showing a relationship between an intensity ratio of I(440)/I(111) and high-temperature cycle efficiency.

In the lithium manganate particles obtained in Comparative Example 6, as shown in FIG. 7, it was confirmed that Al was localized on the surface of the respective particles, and was not uniformly present over the section thereof.

The lithium manganate particles obtained in Comparative Example 7 were measured in the same manner as in Example 2 and Comparative Example 6 to determine a composition of section of the respective particles. As a result, it was confirmed that Al was localized on the surface of the respective particles, and was not uniformly present over the section thereof.

TABLE 1

| Examples and Comparative Examples | Precursor Mn compound | | Coating material | | Mixing Amount of Li |
|---|---|---|---|---|---|
| | Kind (—) | Average particle diameter ($D_{50}$) (μm) | Element (—) | Y (—) | X (—) |
| Example 1 | $Mn_3O_4$ | 1 | Al | 0.10 | 0.065 |
| Example 2 | $Mn_3O_4$ | 4 | Al | 0.10 | 0.065 |
| Example 3 | $Mn_3O_4$ | 7 | Al | 0.10 | 0.065 |
| Example 4 | $Mn_3O_4$ | 4 | Al | 0.20 | 0.065 |
| Example 5 | $Mn_3O_4$ | 4 | Al | 0.05 | 0.090 |
| Example 6 | $Mn_3O_4$ | 4 | Al | 0.10 | 0.100 |
| Example 7 | $Mn_3O_4$ | 4 | Al | 0.10 | 0.083 |
| Example 8 | $Mn_3O_4$ | 4 | Al | 0.10 | 0.083 |
| Example 9 | $Mn_3O_4$ | 4 | Mg | 0.05 | 0.080 |
| Example 10 | $Mn_3O_4$ | 4 | Co | 0.05 | 0.100 |
| Comparative Example 1 | $MnO_2$ | 15 | — | — | 0.065 |
| Comparative Example 2 | $MnO_2$ | 15 | Al | 0.10 | 0.065 |
| Comparative Example 3 | $Mn_3O_4$ | 4 | Al | 0.05 | 0.005 |
| Comparative Example 4 | $Mn_3O_4$ | 4 | Al | 0.10 | 0.065 |
| Comparative Example 5 | $Mn_3O_4$ | 4 | Al | 0.10 | 0.065 |
| Comparative Example 6 | $Mn_3O_4$ | 4 | Al | 0.10 | 0.066 |
| Comparative Example 7 | $Mn_3O_4$ | 4 | — | — | 0.065 |
| Comparative Example 8 | $Mn_3O_4$ | 4 | Al | 0.00 | 0.101 |
| Comparative Example 9 | $Mn_3O_4$ | 4 | Al | 0.25 | 0.020 |

| Examples and Comparative Examples | Additives | | | Calcining conditions | |
|---|---|---|---|---|---|
| | Kind (—) | Particle diameter (μm) | y (—) | Temp. (° C.) | Time (hr) |
| Example 1 | — | — | — | 960 | 4 |
| Example 2 | — | — | — | 960 | 4 |
| Example 3 | — | — | — | 960 | 4 |
| Example 5 | — | — | — | 960 | 4 |
| Example 6 | — | — | — | 960 | 4 |
| Example 7 | — | — | — | 960 | 4 |
| Example 8 | — | — | — | 1040 | 4 |
| Example 9 | — | — | — | 960 | 4 |
| Example 10 | — | — | — | 960 | 4 |
| Comparative Example 1 | $Al(OH)_3$ | 0.5 | 0.10 | 960 | 4 |
| Comparative Example 2 | — | — | — | 960 | 4 |

TABLE 1-continued

| | | | | | |
|---|---|---|---|---|---|
| Comparative Example 3 | — | — | — | 960 | 4 |
| Comparative Example 4 | — | — | — | 760 | 4 |
| Comparative Example 5 | — | — | — | 840 | 4 |
| Comparative Example 6 | — | — | — | 880 | 4 |
| Comparative Example 7 | Al(OH)$_3$ | 0.5 | 0.10 | 960 | 4 |
| Comparative Example 8 | — | — | — | 960 | 4 |
| Comparative Example 9 | — | — | — | 960 | 4 |

TABLE 2

Properties of lithium manganate particles

| Examples and Comparative Examples | Composition Li$_{1+x}$Mn$_{2-x-y}$Y$_y$O$_4$ | | Average primary particle diameter (μm) | Average particle diameter D$_{50}$ (μM) | BET specific surface area (m$^2$/g) |
|---|---|---|---|---|---|
| | x | y | | | |
| Example 1 | 0.065 | 0.10 | 1 | 4.0 | 0.94 |
| Example 2 | 0.065 | 0.10 | 4 | 6.7 | 0.65 |
| Example 3 | 0.065 | 0.10 | 7 | 8.6 | 0.45 |
| Example 4 | 0.065 | 0.20 | 4 | 6.5 | 0.69 |
| Example 5 | 0.090 | 0.05 | 4 | 6.8 | 0.65 |
| Example 6 | 0.100 | 0.10 | 4 | 6.4 | 0.65 |
| Example 7 | 0.083 | 0.10 | 4 | 6.7 | 0.66 |
| Example 8 | 0.083 | 0.10 | 4 | 7.5 | 0.62 |
| Example 9 | 0.080 | 0.05 | 4 | 6.5 | 0.55 |
| Example 10 | 0.078 | 0.05 | 4 | 6.5 | 0.50 |
| Comparative Example 1 | 0.065 | 0.10 | 1-30 | 15.5 | 0.67 |
| Comparative Example 2 | 0.065 | 0.10 | 1-30 | 16.5 | 0.66 |
| Comparative Example 3 | 0.005 | 0.05 | 4 | 6.7 | 0.64 |
| Comparative Example 4 | 0.065 | 0.10 | 4 | 6.2 | 1.10 |
| Comparative Example 5 | 0.065 | 0.10 | 4 | 6.4 | 0.82 |
| Comparative Example 6 | 0.065 | 0.10 | 4 | 6.5 | 0.75 |
| Comparative Example 7 | 0.065 | 0.10 | 4 | 6.7 | 0.65 |
| Comparative Example 8 | 0.101 | 0.00 | 4 | 7.2 | 0.55 |
| Comparative Example 9 | 0.020 | 0.25 | 4 | 6.3 | 0.75 |

Properties of lithium manganate parcicles

| Examples and Comparative Examples | Lattice constant (nm) | X-ray diffraction intensity ratio | | BET specific surface area after compressed (m$^2$/g) | Rate of change in BET Δ/BET-1 (%) |
|---|---|---|---|---|---|
| | | I(400) (%) | I(440) (%) | | |
| Example 1 | 0.8203 | 38 | 20 | 0.96 | 2.1 |
| Example 2 | 0.8201 | 41 | 22 | 0.68 | 4.6 |
| Example 3 | 0.8202 | 47 | 30 | 0.48 | 6.7 |
| Example 4 | 0.8195 | 40 | 20 | 0.72 | 4.3 |
| Example 5 | 0.8193 | 42 | 23 | 0.67 | 3.1 |
| Example 6 | 0.8193 | 42 | 23 | 0.67 | 3.1 |
| Example 7 | 0.8196 | 43 | 22 | 0.69 | 4.5 |
| Example 8 | 0.8196 | 47 | 24 | 0.64 | 3.2 |
| Example 9 | 0.82 | 45 | 25 | 0.58 | 5.5 |
| Example 10 | 0.8196 | 47 | 26 | 0.54 | 8.0 |
| Comparative Example 1 | 0.8203 | 32 | 15 | 0.75 | 11.9 |
| Comparative Example 2 | 0.8202 | 35 | 17 | 0.75 | 13.6 |
| Comparative Example 3 | 0.8212 | 40 | 20 | 0.68 | 6.3 |
| Comparative Example 4 | 0.8205 | 28 | 12 | 1.15 | 4.5 |
| Comparative Example 5 | 0.8202 | 32 | 15 | 0.85 | 3.7 |
| Comparative Example 6 | 0.82 | 35 | 20 | 0.8 | 6.7 |
| Comparative Example 7 | 0.8204 | 41 | 22 | 0.68 | 4.6 |
| Comparative Example 8 | 0.8207 | 40 | 23 | 0.58 | 5.5 |
| Comparative Example 9 | 0.8180 | 35 | 18 | 0.82 | 9.3 |

Properties of cell

| Examples and Comparative Examples | Output characteristics | | | High-temperature characteristics (60° C.) | | |
|---|---|---|---|---|---|---|
| | Capacity | | | Storage characteristics | | 30Cy |
| | 0.1 C. (mAh/g) | 10 C. (mAh/g) | Ratio (%) | RTN (%) | RCV (%) | RTN (%) |
| Example 1 | 108 | 100 | 93 | 65 | 90 | 95 |
| Example 2 | 108 | 98 | 91 | 70 | 92 | 93 |
| Example 3 | 107 | 96 | 90 | 82 | 93 | 94 |
| Example 4 | 91 | 80 | 88 | 75 | 91 | 97 |
| Example 5 | 105 | 95 | 90 | 73 | 92 | 95 |
| Example 6 | 92 | 84 | 91 | 77 | 94 | 93 |
| Example 7 | 100 | 93 | 93 | 75 | 93 | 95 |
| Example 8 | 101 | 94 | 93 | 80 | 96 | 96 |
| Example 9 | 100 | 92 | 92 | 80 | 92 | 94 |
| Example 10 | 100 | 96 | 96 | 83 | 96 | 97 |
| Comparative Example 1 | 107 | 75 | 50 | 40 | 75 | 88 |
| Comparative Example 2 | 106 | 80 | 60 | 45 | 77 | 87 |
| Comparative Example 3 | 120 | 105 | 88 | 43 | 88 | 88 |
| Comparative Example 4 | 105 | 50 | 48 | 45 | 78 | 80 |
| Comparative Example 5 | 107 | 55 | 51 | 50 | 80 | 85 |
| Comparative Example 6 | 106 | 75 | 71 | 63 | 85 | 90 |
| Comparative Example 7 | 107 | 73 | 68 | 55 | 70 | 75 |
| Comparative Example 8 | 106 | 95 | 90 | 35 | 67 | 75 |
| Comparative Example 9 | 101 | 78 | 77 | 53 | 85 | 82 |

In the foregoing, although the present invention is explained in detail by Examples, the numeral ranges as defined in the present invention are necessarily intended to involve all of the ranges using the numerals described in any optional one of the above Examples as a critical value unless departing from the scope of the present invention, and it should be construed that all of them are described in the present specification.

Industrial Applicability

In the lithium manganate particles according to the present invention, a different kind of metal such as Al, Co or Mg is uniformly present within the respective particles. In addition, the lithium manganate particles have a high crystallinity and, therefore, are suitable as a positive electrode active substance for a secondary battery exhibiting a high output and excellent high-temperature storage characteristics.

The invention claimed is:

1. Lithium manganate particles having a primary particle diameter of not less than 1 μm and an average particle diameter (D50) of secondary particles of 1 to 10 μm, which have a composition represented by the following chemical formula:

Li1+xMn2-x-yYyO4 in which Y is at least one element selected from the group consisting of Al, Mg and Co; x and y satisfy 0.03≦x≦0.15 and 0.05≦y≦0.20, respectively,
the Y element being uniformly dispersed within the respective particles,
an intensity ratio of I(400)/I(111) thereof being not less than 33% and
an intensity ratio of I(440)/I(111) thereof being not less than 16% said lithium manganate particles being calcined at a temperature greater than 900° C.

2. Lithium manganate particles according to claim 1, wherein the lithium manganate particles have a lattice constant of 0.818 to 0.821 nm.

3. Lithium manganate particles according to claim 1, wherein a rate of change in BET specific surface area of the lithium manganate particles when applying a pressure of 1 ton/cm2 thereto is 0 to 10% based on a BET specific surface area of the particles before applying the pressure thereto.

4. Lithium manganate particles according to claim 1, wherein upon measurement of charge/discharge capacities of a battery obtained using the lithium manganate particles, an initial discharge capacity thereof is not less than 80 mAh/g and not more than 110 mAh/g.

5. A process for producing the lithium manganate particles as defined in claim 1, comprising the steps of:
mixing manganese oxide particles whose surface is coated with a compound of at least one element selected from the group consisting of Al, Co and Mg, with lithium carbonate; and
calcining the resulting mixture at a temperature greater than 900° C.

6. A process according to claim 5, further comprising the step of adding an Al-containing aqueous solution to a water suspension comprising the manganese oxide particles to suitably adjust a pH value of the resulting mixture, wherein an Al compound formed on the surface of the respective manganese oxide particles is non-crystalline as analyzed by an X-ray diffraction method.

7. A process according to claim 5, wherein the manganese oxide particles have an average particle diameter of not less than 1.0 μm.

8. A non-aqueous electrolyte secondary battery comprising a positive electrode active substance a part or whole of which is formed from the lithium manganese particles as defined in claim 1.

9. Lithium manganate particles having a primary particle diameter of not less than 1 μm and an average particle diameter (D50) of secondary particles of 1 to 10 μm, which have a composition represented by the following chemical formula:

Li1+xMn2-x-yYyO4 in which Y is at least one element selected from the group consisting of Al, Mg and Co; x and y satisfy 0.03≦x≦0.15 and 0.05≦y≦0.20, respectively,
the Y element being uniformly dispersed within the respective particles,
an intensity ratio of I(400)/I(111) thereof being not less than 33% and
an intensity ratio of I(440)/I(111) thereof being not less than 16%;
wherein when a section of the respective particles is subjected to EDX plane analysis by observing the particles using a scanning electron microscope equipped with an energy disperse type X-ray analyzer, the area of a white portion appearing on its micrograph which indicates the presence of the Y element is not less than 98% of a cross-sectional area of the respective particles.

* * * * *